US010585604B2

(12) United States Patent
Bassov

(10) Patent No.: US 10,585,604 B2
(45) Date of Patent: Mar. 10, 2020

(54) TOOL FOR SELECTIVELY DEPLOYING INLINE COMPRESSION

(71) Applicant: EMC IP Holding Company LLC, Hopkinton, MA (US)

(72) Inventor: Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 15/966,584

(22) Filed: Apr. 30, 2018

(65) Prior Publication Data

US 2019/0332288 A1 Oct. 31, 2019

(51) Int. Cl.
*G06F 12/00* (2006.01)
*G06F 3/06* (2006.01)

(52) U.S. Cl.
CPC .......... *G06F 3/0626* (2013.01); *G06F 3/064* (2013.01); *G06F 3/067* (2013.01); *G06F 3/0629* (2013.01); *G06F 3/0643* (2013.01)

(58) Field of Classification Search
None
See application file for complete search history.

(56) References Cited

U.S. PATENT DOCUMENTS

| 9,779,023 | B1 | 10/2017 | Armangau et al. | |
|---|---|---|---|---|
| 9,985,649 | B1 | 5/2018 | Bassov et al. | |
| 2015/0149739 | A1* | 5/2015 | Seo | G06F 3/0608 711/162 |

OTHER PUBLICATIONS

Ivan Bassov, et al.; "Compressing Data in Line Using Weighted Compression Budgets," U.S. Appl. No. 15/392,639, filed Dec. 28, 2016.
Philippe Armangau, et al.; "Compression of Host I/O Data in a Storage Processor of a Data Storage System With Selection of Data Compression Components Based on a Current Fullness Level of a Persistent Cache," U.S. Appl. No. 15/957,065, filed Apr. 19, 2018.
Philippe Armangau, et al.; "Managing Inline Data Compression in Storage Systems," U.S. Appl. No. 15/393,443, filed Dec. 29, 2016.
Philippe Armangau, et al.; "Overwriting Compressed Data Extents," U.S. Appl. No. 15/499,206, filed Apr. 27, 2017.
Soumyadeep Sen, et al.; "Unaligned IO Cache for Inline Compression Optimization," U.S. Appl. No. 15/884,739, filed Jan. 31, 2018.

(Continued)

*Primary Examiner* — Jason W Blust
(74) *Attorney, Agent, or Firm* — BainwoodHuang

(57) ABSTRACT

Embodiments are directed to techniques for simplifying and automating the process of transitioning a storage object to use inline compression either on the same machine or migrated to a new machine. This may be accomplished by determining the raw compressibility of the data of a storage obj ect, estimating the interaction between the compressibility of the data and a structure of the inline compression feature, and automatically performing the upgrade or migration if the expected compression savings exceeds a threshold. Some embodiments further speed the process and decrease the resources by determining the raw compressibility through sampling. Embodiments are directed to a method, apparatus, system, and computer program product for performing these techniques.

15 Claims, 4 Drawing Sheets

(56) References Cited

OTHER PUBLICATIONS

Yaming Kuang, et al.; "Recovering Compressed Data to Reduce Data Loss," U.S. Appl. No. 15/395,968, filed Dec. 30, 2016.
Yining Si, et al.; "Inline Compression With Small-Write Compression Avoidance," U.S. Appl. No. 15/662,676, filed Jul. 28, 2017.
Yining Si, et al.; "Write Tagging for Selective Avoidance of Inline Compression," U.S. Appl. No. 15/499,467, filed Apr. 27, 2017.
Philippe Armangau, et al.; "Techniques for Efficiently Organizing Storage of Compressed Extents," U.S. Appl. No. 15/966,878, filed Apr. 30, 2018.
"Framework for Inline Compression Performance Assessment," U.S. Appl. No. 15/281,252, filed Sep. 30, 2016.

* cited by examiner

310
Scan a plurality of other storage objects, {$S_1, S_2, \ldots, S_n$} on which the inline compression feature is already implemented to obtain, for each other storage object, $S_i$, of the set of other storage objects:
- a compressibility metric, $R_i$, that indicates an average block-level compressibility of user data of that other storage object
- an actual overall compression ratio, $R'_i$, of that other storage object resulting from the inline compression feature

320
Calculate the overhead parameter for the inline compression feature by fitting F to the equation $F = (R_i - 1) / (R'_i - 1)$ for the obtained values $R_i$, $R'_i$ and setting the overhead parameter to equal F

TOOL FOR SELECTIVELY DEPLOYING INLINE COMPRESSION

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Data storage systems commonly arrange data in structures known as filesystems. Such file systems include both data and metadata. The metadata organizes the file data on disk, such that each file's data can be located, placed in proper sequence, and kept separate from other files' data.

Some filesystems employ compression. Compression allows the data within the filesystem to be stored in a reduced amount of space. Compression may be performed "inline" in certain filesystems, allowing data to be stored in compressed form "on-the-fly" as it is received.

SUMMARY

With conventional data storage systems, if a user is considering upgrading a storage object to use inline compression or migrating to a new system that uses compression, it may be difficult for the user to intelligently decide whether making the transition is worthwhile. For example, the type of data stored on the storage object may have varying degrees of compressibility. Also, the interaction of the raw compressibility of the data with the arrangement of metadata used in inline compression can affect how much storage is saved by upgrading or migrating to use inline compression. It is possible to replicate the entire storage object and apply the compression to the replicated object in order to make a real-world comparison, but doing so, especially when considering upgrading or migrating many storage objects, can be both time-consuming and storage-intensive.

Thus, it would be desirable to simplify and automate the process of transitioning a storage object to use inline compression either on the same machine or migrated to a new machine. This may be accomplished by determining the raw compressibility of the data of a storage object, estimating the interaction between the compressibility of the data and a structure of the inline compression feature, and automatically performing the upgrade or migration if the expected compression savings exceeds a threshold. Some embodiments further speed the process and decrease the resources by determining the raw compressibility through sampling.

In one embodiment, a method of selectively deploying an inline compression feature is performed by a computing device. The method includes (a) scanning preexisting user data stored within a storage object on the computing device to yield a compressibility metric that indicates a representative block-level compressibility of the preexisting user data, the scanning including performing trial compression on blocks of the preexisting user data and generating the compressibility metric based on a compressed size of the blocks and an uncompressed size of the blocks; (b) calculating an overall compression ratio for the storage object based on (i) an overhead parameter specific to the inline compression feature and (ii) the compressibility metric; (c) performing a comparison operation between the overall compression ratio and a threshold minimum value, the comparison operation configured to (1) produce a first result in response to the overall compression ratio exceeding the threshold minimum value, the first result including implementing the inline compression feature in connection with the storage object; and (2) produce a second result in response to the threshold minimum value exceeding the overall compression ratio, the second result including refraining from implementing the inline compression feature in connection with the storage object; and (d) in response to the comparison operation producing the first result, implementing the inline compression feature on one of the storage object on the computing device and a migrated version of the storage object on a remote computing device. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 is a flowchart depicting example methods of various embodiments.

DETAILED DESCRIPTION OF THE INVENTION

Embodiments are directed to techniques for simplifying and automating the process of transitioning a storage object to use inline compression either on the same machine or migrated to a new machine. This may be accomplished by determining the raw compressibility of the data of a storage object, estimating the interaction between the compressibility of the data and a structure of the inline compression feature, and automatically performing the upgrade or migration if the expected compression savings exceeds a threshold. Some embodiments further speed the process and decrease the resources by determining the raw compressibility through sampling.

Figure 1:
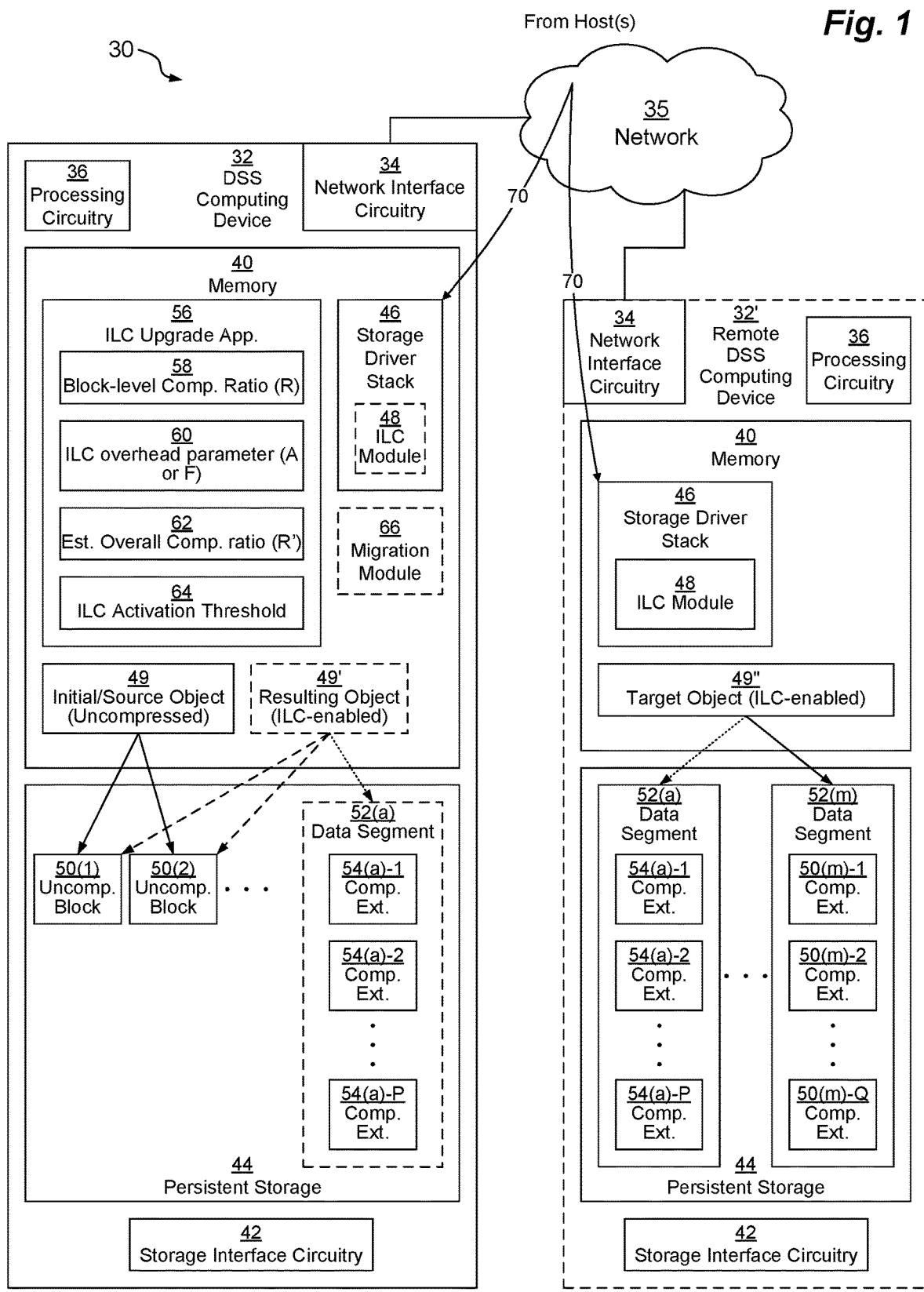
FIG. 1 is a block diagram depicting an example system and apparatus for use in connection with various embodiments.

FIG. 1 depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server, such as a VNX or VMAX data storage array produced by Dell/EMC of Hopkinton, Mass.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network 35. Network interface circuitry 34 allows the DSS computing device 32 to communicate with one or more host devices (not depicted) capable of sending data storage commands to the DSS computing device 32 over the network 35 for fulfillment. Network interface circuitry 34 allows the DSS computing device 32 to communicate with a remote DSS computing device 32', which may be useful in the context of embodiments in which a user wishes to migrate to the remote DSS computing device 32'.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage processors (SPs, not depicted) each mounted on a separate board, each SP having its own network interface circuitry 34, processing circuity 36, memory 40, and storage interface circuitry 42, but sharing the storage 44 between them. In such embodiments, a high-speed inter-SP bus may connect the SPs. There may be more than one SP installed in DSS computing device 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

In some embodiments, persistent storage 44 may be arranged as a set of storage devices in a RAID configuration. Persistent storage 44 may be logically divided into storage blocks, which, in some embodiments, are 8-kilobyte extents of data that are individually-addressable (although the size may vary from system to system and even within a given system, depending on the configuration as is well-known in the art). Some blocks may store uncompressed blocks 50 of data, while other blocks may combine together to store a data segment 52, which is a container made up of an integer number of blocks that are logically combined into one large extent.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a storage driver stack 46 (which may include several different storage-related drivers, not depicted, that are arranged in a stack configuration) which executes on processing circuitry 36 to fulfill data storage requests from hosts. Memory 40 also stores an Inline Compression (ILC) upgrade application 56 and a representation of a storage object 49 that a user wishes either to upgrade to start using ILC or to migrate to a remote DSS computing device 32' that uses ILC. In some embodiments, in order to effect the migration, memory 40 may also store a migration module 66. In embodiments in which the DSS computing device 32 is configured to implement ILC, storage stack 46 of the DSS computing device 32 may also include an ILC module 48 that is configured to implement ILC.

A storage object is any logical grouping of data that may be written to, read from, created, or deleted that is backed by persistent storage 44. For example, the various kinds of storage objects include a logical volume, a filesystem, an iSCSI logical unit of storage, a directory, and a regular file.

Memory 40 may also store various other data structures used by the OS, storage driver stack 46, ILC module 48, migration module 66, and various other applications (not depicted). This data includes a block-level compression ratio (R) variable 58, an ILC overhead parameter 60 associated with the ILC feature, an estimated overall compression ratio (R') variable 62, and an ILC activation threshold 64, which are used by ILC upgrade application 56, for example.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, storage driver stack 46, ILC module 48, migration module 66, representations of storage objects 49, ILC overhead parameter 60, and ILC activation threshold 64 are typically stored in this persistent storage portion of memory 40 or on persistent storage 44 so that they may be loaded into a system portion of memory 40 from this persistent storage portion of memory 40 or persistent storage 44 upon a system restart or as needed. Storage driver stack 46, ILC module 48, or migration module 66, when stored in non-transient form either in the volatile portion of memory 40 or on persistent storage drives 44 or in persistent portion of memory 40, forms a computer program product. The processing circuitry 36 running one or more applications and/or storage driver stack 46 thus forms a specialized circuit constructed and arranged to carry out the various processes described herein.

In operation, a host sends data storage requests (e.g., read, write, create, or delete requests) directed at a storage object to a storage stack 46, which translates the data storage requests into lower-level instructions to access particular addresses of persistent storage 44. The initial or source storage object 49 is configured in an uncompressed state, so storage requests that are directed at the initial or source storage object 49 are fulfilled with respect to uncompressed blocks 50 of persistent storage 44.

In further operation, a user (not depicted) sends a command (either via network interface circuitry 34 or via user interface circuitry, not depicted) to the ILC upgrade application 56 directing the ILC upgrade application 56 to selectively either upgrade the initial or source storage object 49 to start using ILC (in which case it becomes a resulting storage object 49' that has ILC enabled) or migrate the initial or source storage object 49 to a target storage object 49" on remote DSS computing device 32'. In response, ILC upgrade application 56, scans at least some of the uncompressed blocks 50 (depicted as uncompressed blocks 50(1), 50(2), . . . ) that are pointed to by metadata structures (e.g., inodes, indirect blocks, and intermediate pointer structures such as virtual block maps or VBMs) of the initial or source storage object 49 and which store the user data of the initial or source storage object 49. This scanning process includes performing trial compression on one or more uncompressed blocks 50 and comparing the size of the resulting compressed version to the original size (which is the system block size multiplied by the number of uncompressed blocks 50 that were trial-compressed) to yield a block-level compression ratio 58 as a compressibility metric (R) of the user data. As described herein, the block-level compression ratio 58 is computed as an uncompressed size divided by a compressed size, so values greater than 1 indicate a benefit to using compression. It should be understood that other equivalent techniques for measuring compressibility could be used as well, such as dividing a compressed size by an uncompressed size, but the math would have to be modified as is well-understood in the art.

ILC upgrade application 56 then performs one or more calculations involving the block-level compression ratio 58 and a stored ILC overhead parameter 60 specific to the ILC compression feature to yield an estimated overall compression ratio (R') 62. If the estimated overall compression ratio (R') 62 exceeds the pre-defined ILC activation threshold 64, then, ILC upgrade application 56 implements the ILC feature, either by directing the migration module 66 to migrate the source storage object 49 to a target storage object 49'' on remote DSS computing device 32' with ILC enabled or by locally-enabling ILC by activating ILC module 48 for any new write commands 70 received from a host on the network 70 directed at the storage object 49 (thenceforth referred to as resulting storage object 49').

Figure 2:
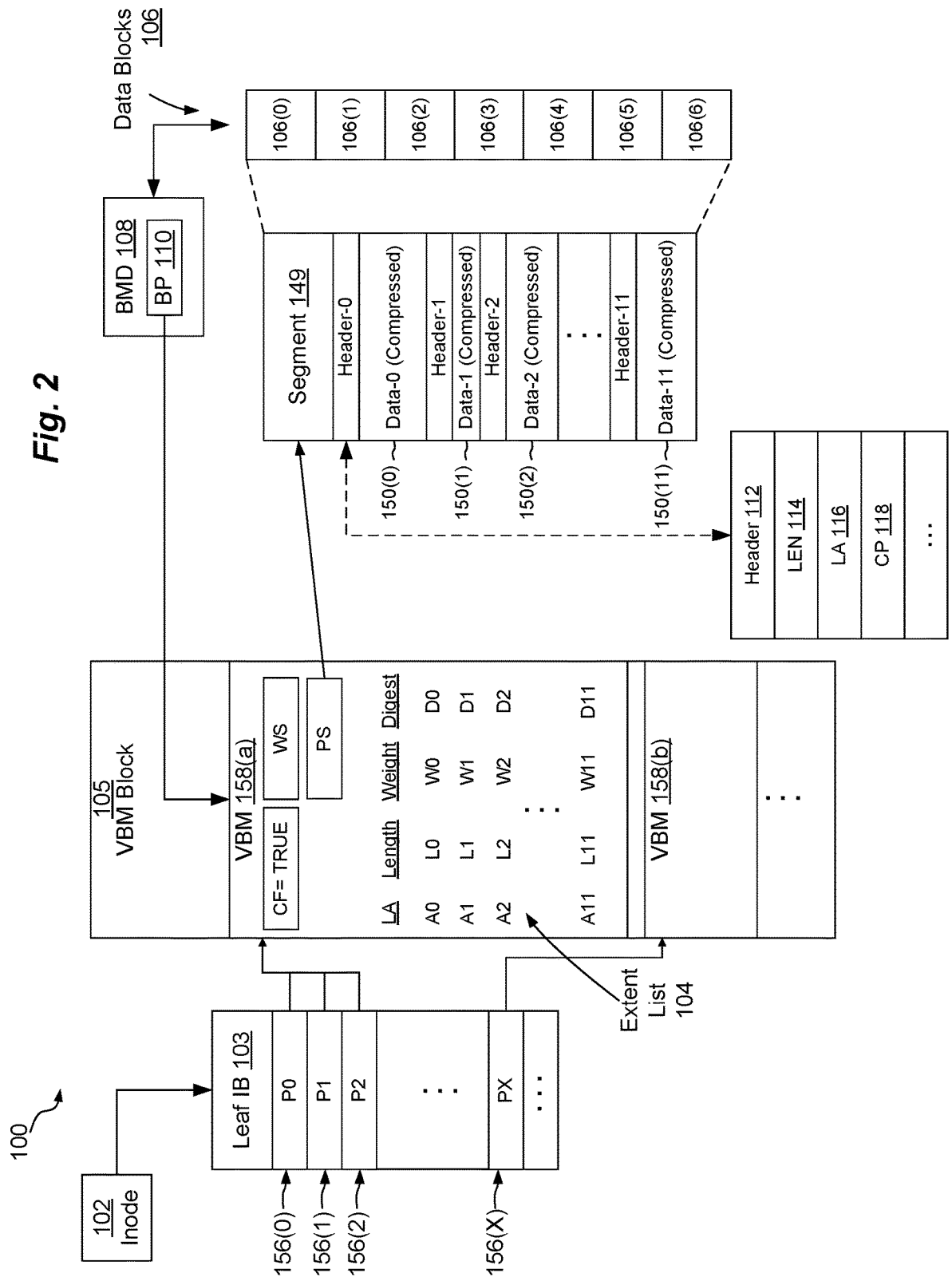
FIG. 2 is a block diagram depicting example data structures used in connection with various embodiments.

FIG. 2 shows an example arrangement 100 of filesystem metadata structures used within storage objects 49, 49', 49'' when implemented as filesystems in more detail. A filesystem pointer structure includes an inode 102 that points to a leaf indirect block (IB) 103. Leaf IB 103 includes mapping pointers 156, which map logical addresses of the file to corresponding physical addresses (filesystem block numbers or FSBNs) in the file system. For example, mapping pointer 156(0) maps logical address A0, mapping pointer 156(1) maps logical address A1, and mapping pointer 156(2) maps logical address A2. Each logical address (A0, A1, or A2) describes a block-sized increment of storage in the file, even though the underlying data may be compressed to much less than the size of a block. Each of these mapping pointers 156(0), 156(1), 156(2) points to a VBM 158(a).

Leaf IB 103 may include additional mapping pointers 156 (e.g., a total of 9 or more, up to a maximum permitted number per segment 52, such as, for example, twelve) that all point to VBM 158(a) for addressing respective extents of compressed data in segment 149. Leaf IB 103 may also store additional mapping pointers, such as mapping pointer 156 (X), which point to other segments 52 via other VBMs such as VBM 158(b). Leaf IB 103 may include any number of mapping pointers 156, a typical number being 1024.

In the example shown, mapping pointers 156(0), 156(1), 156(2) in leaf IB 103 all point to compressed VBM 158(a). VBM 158(a) has a compression flag CF, a weight WS, and a pointer PS. The compression flag CF indicates whether or not VBM 158(a) represents compressed data, in this example indicating that it does. The weight WS indicates the number of mapping pointers 156 that point to that VBM 158(a), and the pointer PS points to the physical address (FSBN) of the segment 149, which by convention may be selected to be the address of the first data block in segment 149, i.e., data block 106(0). The VBM 158(a) also has an extent list 104. Extent list 104 describes the contents of segment 149 and relates, for each extent of compressed data, the logical address (LA) of that item in the file (e.g., A0, A1, A2, ..., A11), a length (L0, L1, L2, ..., L11, e.g., in bytes of that compressed data in the segment 149), a weight (W0, W1, W2, ..., W11), and a digest 60 (e.g., D0, D1, D2, ..., D11) of the contents of the extent 150. In an example, the sum of weights of extents in the extent list 104 equals the total weight WS of the VBM 158(a).

As depicted, segment 149 is composed of contiguous data blocks 106, i.e., blocks 106(0) through 106(6). For purposes of storing compressed data, boundaries between blocks 106(0) through 106(7) may be ignored and the segment 149 may be treated as one continuous space. However, in some embodiments, 512-byte sector boundaries within the blocks 106 may be used as valid starting points for each compressed extent or associated header 112.

In an example, segment 149 has associated per-block metadata (BMD) 108. By convention, the BMD 108 may be provided for the first block 106(0) in segment 149. The filesystem ensures that BMD 108 has a known location relative to block 106(0) and vice-versa, such that the location of one implies the location of the other. BMD 108 may also store a back-pointer 110 to the VBM 158(a), i.e., to the particular VBM 158(a) that maps the compressed data stored in segment 149.

The detail shown in segment 149 indicates an example layout of compressed extents 150. For instance, Header-0 can be found immediately before compressed Data-0 in extent 150(0). Likewise, Header-1 can be found immediately before compressed Data-1 in extent 150(1). Similarly, Header-2 can be found immediately before compressed Data-2 in extent 150(2). Since, as depicted, the extent list 104 of VBM 158(a) has twelve entries, segment 149 includes twelve compressed extents 150(0), 150(1), 150(2), ..., 150(11) and twelve headers 112: Header-0, Header-1, Header-2, ..., Header-11, one for each respective compressed extent 150.

It should be understood that although extent list 104 is depicted having twelve entries, it may have a different number. Extent list 104 of a compressed VBM 158(a) may have any number of entries (and segment 149 the same number of compressed extents 150) ranging from one up to a maximum permitted number for the ILC feature, which, in some embodiments, is twelve. Segment 149, although depicted as being made up of seven blocks 106(0)-106(6), may have any number of segments 106 as needed to store all of the headers 112 and compressed extents 150, but, in order to make the ILC feature worthwhile, the number of blocks 106 is always at least one less than the number of compressed extents 150 in a segment 149.

A compression header 112 is shown for illustration and is intended to be representative of all compression headers in segment 149 (or in any segment 52). In an example, each compression header 112 is a fixed-size data structure that includes multiple data elements, such as the following:

LEN 114: the length of the corresponding extent of compressed data; e.g., in bytes.

LA 116: the logical address (e.g., A0, A1, A2, ..., A11) of the corresponding extent of compressed data within the file.

CP 118: a compression procedure (or algorithm) used to compress the data, such as LZ-L3, LZH-L4, "Hardware," and so on.

The header 112 may also include additional elements, such as CRC (Cyclic Redundancy Check) and various flags.

VBM 158(a) and at least one other VBM 158(b) are both depicted as being contained within a single VBM block 105, which is a block (e.g., 8 kilobytes in size) that stores both VBMs 158(*a*), 158(*b*) together in persistent storage 44. The size of a VBM 158 can vary by embodiment, but, in one embodiment, a VBM is about 512 bytes, and a VBM block 105 may hold sixteen VBMs 158. A VBM 158 may represent compressed data, as shown in the context of VBM 158(*a*), or a VBM 158 may instead represent uncompressed data (not depicted), in which case the compression flag CF is set to false, the extent list 104 has a fixed number of entries (e.g., eight), and the segments 149 are of a fixed length, each holding the fixed number of uncompressed blocks 50 without headers 112. In addition, since all extents are the same length when not compressed, there is no need to separately store the Length of each entry. Rather, extent list 104 may instead store a block offset that indicates an offset into segment 149. Since each extent is uncompressed, each extent is stored entirely within a physical block 106 of the segment 149.

Figure 3:
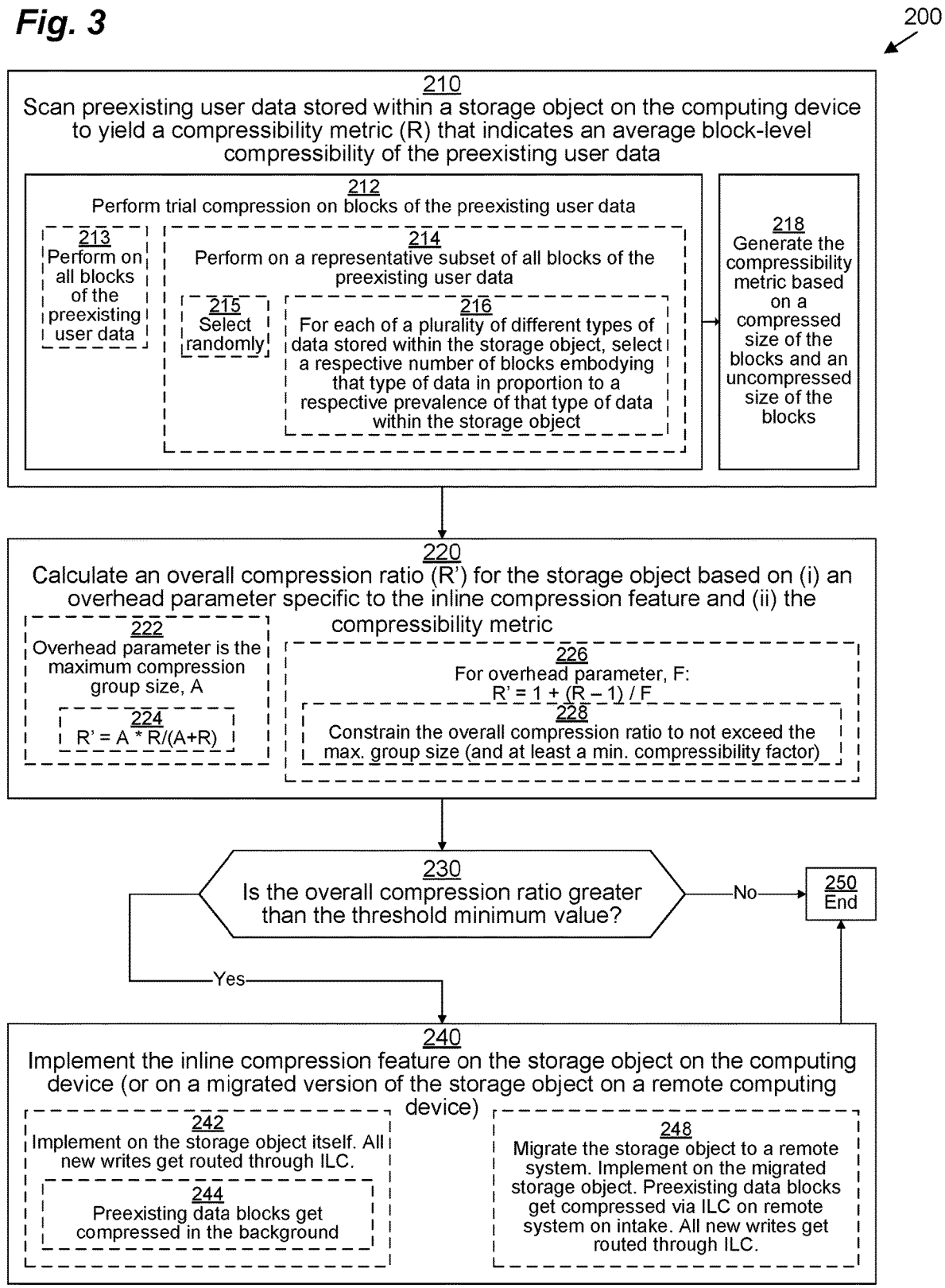
FIG. 3 is a flowchart depicting example methods of various embodiments.

FIG. 3 illustrates an example method 200 performed by ILC upgrade application 56 in conjunction with other applications for selectively deploying an ILC feature in connection with a storage object 49. It should be understood that any time a piece of software (e.g., storage driver stack 46, ILC module 48, ILC upgrade application 56, migration module 66, etc.) is described as performing a method, process, step, or function, in actuality what is meant is that a computing device (e.g., DSS computing device 32, remote DSS computing device 32', etc.) on which that piece of software is running performs the method, process, step, or function when executing that piece of software on its processing circuitry 36. It should be understood that one or more of the steps or sub-steps of method 200 may be omitted in some embodiments. Similarly, in some embodiments, one or more steps or sub-steps may be combined together or performed in a different order. Sub-steps 212, 213, 214, 215, 216, 218, 222, 224, 226, 228, 242, 244, 248 of method 200 that are marked with dashed lines may be deemed to be either optional or representative of alternative embodiments. Method 200 is performed by DSS computing device 32 (and, in some embodiments, partially by remote DSS computing device 32').

In some embodiments, method 200 may be initiated upon ILC upgrade application 56 receiving an instruction from a user to selectively deploy an ILC feature in connection with a storage object 49. In some embodiments, the instruction identifies a particular source/initial storage object 49, while in other embodiments, the instruction may indicate several (or all) storage objects managed by the DSS computing device 32. The instruction either indicates that a source storage object 49 that currently does not use ILC should be selectively migrated to a target storage object 49" on remote DSS computing device 32' or it indicates that an initial storage object 49 that currently does not use ILC should be selectively upgraded to become a resulting storage object 49' that remains on the DSS computing device 32 but is configured to use ILC. In some embodiments, the instruction may indicate either that ILC should be selectively enabled only for newly-written data or that compression should also be retroactively applied to previously-written data.

In step 210, ILC upgrade application 56 scans preexisting user data stored within source/initial storage object 49 on the DSS computing device 32 to yield a compressibility metric (R) that indicates a representative block-level compressibility 58 of the preexisting user data. Step 210 includes sub-steps 212 and 218.

In sub-step 212, ILC upgrade application 56 performs trial compression on uncompressed blocks 50 of preexisting user data of the source/initial storage object 49. Performing trial compression on an uncompressed block 50 may include running a lossless compression engine on the contents of the uncompressed block 50 and recording a size of the output in bytes. The compression is referred to as "trial" compression because the output need not be kept once it is measured. Any kind of lossless compression engine may be used, such as, for example, a run-length encoder, a Lempel-Ziv type encoder, or any other known type of lossless data encoding. In some embodiments, several different lossless compression engines may be applied and the one with the smallest output may be selected. In other embodiments, one of several different lossless compression engines may be selected based on a type of data identified to be within the uncompressed block 50, and then only that selected lossless compression engine may be applied. Sub-step 212 may either encompass sub-sub-step 213 or sub-sub-step 214.

In sub-sub-step 213, ILC upgrade application 56 performs the trial compression on all of the uncompressed blocks 50 of the preexisting user data of the source/initial storage object 49 stored in persistent storage 44.

In sub-sub-step 214, ILC upgrade application 56 performs the trial compression on a representative subset of the uncompressed blocks 50 of the preexisting user data of the source/initial storage object 49 stored in persistent storage 44. In one embodiment, in sub-sub-sub-step 215, ILC upgrade application 56 randomly selects the representative subset of the uncompressed blocks 50.

In another embodiment, in sub-sub-sub-step 216, for each of a plurality of different types of data (e.g., video data, audio data, text-based data, database data, etc.) stored within the source/initial storage object 49, ILC upgrade application 56 selects a respective number of uncompressed blocks 50 embodying that type of data in proportion to a respective prevalence of that type of data within the source/initial storage object 49. For example, if the source/initial storage object 49 includes 5 million uncompressed blocks 50 of which 40% are video, 40% are database, and 20% are text-based, sub-sub-sub-step 216 may include selecting (possibly randomly) 1,000 uncompressed blocks 50 that embody video data, 1,000 uncompressed blocks 50 that embody database data, and 500 uncompressed blocks 50 that embody text-based data for representative trial compression.

In sub-step 214, ILC upgrade application 56 generates the compressibility metric (R) based on a compressed size of the resulting trial-compressed blocks and an uncompressed size of the uncompressed blocks 50. Since in most systems, all uncompressed blocks 50 have the same size (e.g., 8 kilobytes), the uncompressed size is just the number of selected uncompressed blocks 50 (sub-sub-step 214) or the total number of uncompressed blocks 50 (sub-sub-step 213) multiplied by the standard size of an uncompressed block 50. In one embodiment the compressibility metric (R) is calculated by dividing the uncompressed size by the compressed size.

In step 220, ILC upgrade application 56 calculates an overall expected compression ratio (R') 62 for the resulting/target storage object 49', 49" based on (i) an overhead parameter 60 specific to the ILC feature and (ii) the compressibility metric (R) 58. Step 220 may either encompass sub-step 222 or sub-step 226.

In some embodiments, in sub-step 222, the overhead parameter is defined to be a value, A, that represents the maximum permitted number (e.g., twelve) of compressed extents 150 per segment 149 (see FIG. 2) allowed by the ILC feature. ILC upgrade application 56 calculates the overall expected compression ratio (R') 62 using the value A as well as the compressibility metric (R) 58. Thus, in sub-sub-step 224, ILC upgrade application 56 calculates the overall expected compression ratio (R') 62 by calculating the value of (A*R)/(A+R) (or an equivalent).

In other embodiments, in sub-step 226, the overhead parameter is another value, F that is pre-specified for the ILC feature. An example value of F is 1.66. ILC upgrade application 56 calculates the overall expected compression ratio (R') 62 calculating the value of 1+(R−1)/F (or an equivalent). In some embodiments, in sub-sub-step 228 ILC upgrade application 56 constrains the overall expected compression ratio (R') 62 to not exceed the value A, which represents the maximum permitted number (e.g., twelve) of compressed extents 150 per segment 149 (see FIG. 2) allowed by the ILC feature. This is because the design of arrangement 100 (see FIG. 2) makes it impossible for more than A compressed extents 150 to be stored within a single block 106, which limits the maximum overall compression ratio to be at most A. Thus, in one example, F has a value of 0.85 and R has a calculated value of 11.1, so the formula of sub-step 226 implies that R' should have a value of 1+(11.1−1)/0.85=12.88 (approximately). However, in sub-sub-step 228, since 12.88 is greater than 12 (which is the value of A in this example), ILC upgrade application 56 constrains R' to be equal to 12. In some embodiments, as part of sub-sub-step 228, ILC upgrade application 56 constrains R' to be no less than a minimum compression ratio to trigger compression, such as, for example, 1.33. Thus, in these embodiments, if the block-level compressibility of any given uncompressed block 50 is less than 1.33, that uncompressed block 50 would remain uncompressed and not be subject to ILC, so ILC upgrade application 56 constrains R' to be no smaller than 1.33.

In step 230, ILC upgrade application 56 determined whether or not the calculated overall expected compression ratio (R') 62 is greater than the pre-defined ILC activation threshold 64. If it is, then operation proceeds with step 140. If the calculated overall expected compression ratio (R') 62 is not greater than the pre-defined ILC activation threshold 64, then operation proceeds directly to step 250.

It should be understood that operation of step 230 has been expressed assuming a definition of R 58 as defined by an uncompressed size divided by a compressed size. However, in embodiments in which R 58 is defined as the inverse, the formulae of sub-steps 224 and 226 must be modified accordingly, and step 230 would have the opposite trigger.

In step 240, because the overall compression ratio (R') 62 is high enough, ILC upgrade application 56 causes the ILC feature to be implemented with respect to the storage object 49. In some embodiments, step 240 takes the form of sub-step 242, while in other embodiments, step 240 takes the form of sub-step 248.

In sub-step 242, ILC upgrade application 56 implements the ILC feature on the DSS computing device 32 itself by directing the ILC module 48 to implement the ILC feature on all new write instructions 70 to the resulting storage object 49' (which is just a new way to refer to the initial storage object 49 once the ILC feature is enabled). Thus, in one example embodiment as depicted in FIG. 1, in response to the new write instructions 70 received from a host by the storage driver stack 46, the resulting storage object 49' newly points (as indicated by the dotted line) to compressed extents 54 (depicted as compressed extents 54(a)-1, 54(a)-2, . . . , 54(a)-P for some value of P less than or equal to A) within a data segment 52 (e.g., 52(a)) of persistent storage 44 in addition to continuing to point to uncompressed blocks 50(1), 50(2), . . . that represent the preexisting user data.

Sub-step 242 may include setting a flag in connection with the resulting storage object 49' so that the storage diver stack 46 knows to route write requests directed at the resulting storage object 49' through the ILC module 48. In some embodiments, sub-step 242 included ILC upgrade application 56 installing the ILC module 48 on the DSS computing device 32 as an upgrade to the storage driver stack 46.

In some embodiments, sub-step 242 also includes sub-sub-step 244. In sub-sub-step 244, ILC upgrade application 56 performs a background compression on the uncompressed blocks 50 of preexisting data so that the metadata structures of the resulting storage object 49' no longer point to the uncompressed blocks 50(1), 50(2), . . . of the preexisting data (as indicated by the dashed lines), but instead point to compressed extents 54 within data segments 52 of persistent storage 44 that represent compressed versions of those previously uncompressed blocks 50(1), 50(2), . . . .

In sub-step 248, ILC upgrade application 56 causes the ILC feature to be implemented on the remote DSS computing device 32' for target storage object 49", which is a migrated version of the source storage object 49. ILC upgrade application 56 directs the migration module 66 to migrate the source storage object 49 to the target storage object 49" on the remote DSS computing device 32'. As uncompressed blocks 50 of preexisting user data of the source storage object 49 are transferred to the remote DSS computing device 32', they progress down the storage driver stack 46 of the remote DSS computing device 32', and ILC module 48 of the remote DSS computing device 32' intercepts them before being written to persistent storage 44 of remote DSS computing device 32'. Thus, ILC module 48 of remote DSS computing device 32' compresses the uncompressed blocks 50(1), 50(2), . . . of preexisting user data of the source storage object 49 into compressed extents 50(m)-1, 50(m)-2, . . . of a data segment 52(m) in persistent storage 44 of the remote DSS computing device 32'. As depicted in the example of FIG. 1, data segment 52(m) includes Q compressed extents 50 (depicted as compressed extents 50(m)-1, 50(m)-2, . . . , 50(m)-Q), where Q is some integer between 1 and A, inclusive. Thus, target storage object 49" points to the compressed extents 50(m)-1, 50(m)-2, . . . instead of to uncompressed blocks 50(1), 50(2), . . . . In addition, ILC upgrade application 56 directs the ILC module 48 of the remote DSS computing device 32' to implement the ILC feature on all new write instructions 70 to the target storage object 49". Thus, in one example embodiment as depicted in FIG. 1, in response to the new write instructions 70 received from a host by the storage driver stack 46, the target storage object 49" newly points (as indicated by the dotted line) to compressed extents 54(a)-1, 54(a)-2, . . . , 54(a)-P within a data segment 52(a) of persistent storage 44 of the remote DSS computing device 32'.

Finally, method 200 ends at step 250.

FIG. 4 illustrates an example method 300 performed by a computing device (e.g., DSS computing device 32) for defining the value of F that may be specified for the ILC feature (see sub-step 226 of FIG. 2) in accordance with various embodiments. It should be understood that one or more of the steps or sub-steps of method 400 may be omitted in some embodiments. Similarly, in some embodiments, one or more steps or sub-steps may be combined together or performed in a different order.

In step 310, a computing device scans a plurality of storage objects, $\{S_1, S_2, \ldots, S_n\}$ on which the ILC feature has already been implemented to obtain, for each such storage object $S_i$ of the set, (I) a compressibility metric, $R_i$, that indicates a representative block-level compressibility of user data of that storage object $S_i$, and (II) an actual overall compression ratio, $R'_i$, of that storage object $S_i$ resulting from the ILC feature.

Then, in step 320, the computing device calculates F by fitting the data obtained in step 310 to the equation: $F=(R_i 1)/(R'_i-1)$ for i=1 through x. This value F may then be stored as the overhead parameter 60 for use in connection with sub-step 226 of FIG. 2.

Thus, techniques have been presented for simplifying and automating the process of transitioning a storage object 49 to use ILC either on the same machine 32 or migrated to a new machine 32'. This may be accomplished by determining the raw compressibility, R, of the data of a storage object 49, estimating the interaction between the compressibility R of the data and a structure of the ILC feature (which may be approximated by the overhead parameter 60), and automatically performing the upgrade or migration if the expected compression savings exceeds a threshold. Some embodiments further speed the process and decrease the resources by determining the raw compressibility through sampling.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method, performed by a computing device, of selectively deploying an inline compression feature, the method comprising:

scanning preexisting user data stored within a storage object on the computing device to yield a compressibility metric that indicates a representative block-level compressibility of the preexisting user data, the scanning including performing trial compression on blocks of the preexisting user data and generating the compressibility metric based on a compressed size of the blocks and an uncompressed size of the blocks;

calculating an overall compression ratio for the storage object based on (i) an overhead parameter specific to the inline compression feature and (ii) the compressibility metric;

performing a comparison operation between the overall compression ratio and a threshold minimum value, the comparison operation configured to:

(1) produce a first result in response to the overall compression ratio exceeding the threshold minimum value, producing the first result causing the computing device to implement the inline compression feature in connection with the storage object; and (2) produce a second result in response to the threshold minimum value exceeding the overall compression ratio, producing the second result causing the computing device to refrain from implementing the inline compression feature in connection with the storage obj ect; and in response to the comparison operation producing the first result, implementing the inline compression feature on one of the storage object on the computing device and a migrated version of the storage object on a remote computing device.

2. The method of claim 1 wherein performing trial compression on blocks of the preexisting user data includes performing the trial compression on a representative subset of all blocks of the preexisting user data stored within the storage object.

3. The method of claim 2 wherein performing the trial compression on the representative subset of all blocks of the preexisting user data includes selecting the blocks of the representative subset randomly.

4. The method of claim 2 wherein performing the trial compression on the representative subset of all blocks of the preexisting user data includes, for each of a plurality of different types of data stored within the storage object, selecting a respective number of data blocks embodying that type of data in proportion to a respective prevalence of that type of data within the storage object.

5. The method of claim 4 wherein calculating the overall compression ratio includes dividing a product of the maximum group size and the compressibility metric by a sum of the maximum group size and the compressibility metric.

6. The method of claim 2, wherein the inline compression feature is configured to group a first number of user data blocks together and to store compressed forms of the first number of user data blocks within a second number of data blocks, the second number being smaller than the first number, the inline compression feature being further configured to select as the first number an integer less than or equal to a maximum group size assigned to the inline compression feature; and wherein, when calculating the overall compression ratio, the overhead parameter specific to the inline compression feature is defined to be equal to the maximum group size assigned to the inline compression feature.

7. The method of claim 2 wherein calculating the overall compression ratio includes dividing the compressibility metric minus 1 by the overhead parameter specific to the inline compression feature.

8. The method of claim 7,
wherein the inline compression feature is configured to group a first number of user data blocks together and to store compressed forms of the first number of user data blocks within a second integer number of data blocks, the second number being smaller than the first number, the inline compression feature being further configured to select as the first number an integer less than or equal to a maximum group size assigned to the inline compression feature; and
wherein calculating the overall compression ratio further includes constraining the overall compression ratio to not exceed the maximum group size.

9. The method of claim 7 wherein the method further comprises specifying the overhead parameter for the inline compression feature by:
scanning a plurality of other storage objects $\{S_1, S_2, \ldots, S_n\}$ on which the inline compression feature is already implemented to obtain, for each other storage object, $S_i$, of the set of other storage objects:
a compressibility metric, that indicates a representative block-level compressibility of user data of that other storage object; and
an actual overall compression ratio, $R'_i$, of that other storage object resulting from the inline compression feature; and
calculating the overhead parameter for the inline compression feature by fitting F to the equation $F=(R_i-1)/(R'_i-1)$ for the obtained values $R'_i$ and setting the overhead parameter to equal F.

10. The method of claim 2 wherein, when performing the comparison operation between the overall compression ratio and the threshold minimum value, the threshold minimum value is defined to be at least 1.5.

11. The method of claim 1 wherein implementing the inline compression feature on one of the storage object and a migrated version of the storage object includes implementing the inline compression feature on the storage object by:
receiving a plurality of new user data blocks from a user directed at the storage object;
grouping a first number of the received plurality of new user data blocks together, the inline compression feature being configured to select as the first number an integer less than or equal to a maximum group size assigned to the inline compression feature;
storing compressed forms of the first number of new user data blocks within a second integer number of new data blocks of the storage object, the second number being smaller than the first number.

12. The method of claim 11 wherein implementing the inline compression feature on the storage object further includes storing compressed versions of the blocks of the preexisting user data in place of the blocks of the preexisting user data within the storage object.

13. The method of claim 1 wherein implementing the inline compression feature on one of the storage object and a migrated version of the storage object includes implementing the inline compression feature on the migrated storage on the remote computing device object by:
directing the remote computing device to implement the inline compression feature on a remote storage object of the remote computing device;
sending blocks of the preexisting user data from the storage object on the computing device to the remote storage object of the remote computing device, the remote computing device being configured to repeatedly:
group a first number of the blocks of the preexisting user data together, the inline compression feature being configured to select as the first number an integer less than or equal to a maximum group size assigned to the inline compression feature;
store compressed forms of the first number of the blocks of the preexisting user data within a second integer number of new data blocks of the remote storage object, the second number being smaller than the first number.

14. A computer program product comprising a non-transitory computer-readable storage medium storing a set of instructions, which, when executed by a computing device, cause the computing device to selectively deploy an inline compression feature by:
scanning preexisting user data stored within a storage object on the computing device to yield a compressibility metric that indicates a representative block-level compressibility of the preexisting user data, the scanning including performing trial compression on blocks of the preexisting user data and generating the compressibility metric based on a compressed size of the blocks and an uncompressed size of the blocks;
calculating an overall compression ratio for the storage object based on (i) an overhead parameter specific to the inline compression feature and (ii) the compressibility metric; and
performing a comparison operation between the overall compression ratio and a threshold minimum value, the comparison operation configured to:
(1) produce a first result in response to the overall compression ratio exceeding the threshold minimum value, producing the first result causing the computing device to implement the inline compression feature on the storage object; and
(2) produce a second result in response to the threshold minimum value exceeding the overall compression ratio, producing the second result causing the computing device to refrain from implementing the inline compression feature on the storage object.

15. A system for selectively deploying an inline compression feature, the apparatus comprising:
a first data storage system (DSS) computing device including persistent storage and processing circuitry coupled to memory;
a second DSS computing device including persistent storage and processing circuitry coupled to memory; and
a network connecting the first DSS computing device and the second DSS computing device;
wherein the processing circuitry coupled to memory of the first DSS computing device is configured to:

scan preexisting user data stored within a storage object on the persistent storage of the first DSS computing device to yield a compressibility metric that indicates a representative block-level compressibility of the preexisting user data, the scanning including performing trial compression on blocks of the preexisting user data and generating the compressibility metric based on a compressed size of the blocks and an uncompressed size of the blocks;

calculate an overall compression ratio for the storage object based on (i) an overhead parameter specific to the inline compression feature and (ii) the compressibility metric; and perform a comparison operation between the overall compression ratio and a threshold minimum value, the comparison operation configured to:
  (1) produce a first result in response to the overall compression ratio exceeding the threshold minimum value, producing the first result including directing, over the network, the second DSS computing device to implement the inline compression feature on a migrated version of the storage object on the second DSS computing device; and
  (2) produce a second result in response to the threshold minimum value exceeding the overall compression ratio, producing the second result including refraining from directing the second DSS computing device to implement the inline compression feature in connection with the storage object.

* * * * *